Dec. 29, 1959 S. B. KILNER 2,919,175
PROCESS OF RECOVERING URANIUM
Filed Oct. 16, 1944 10 Sheets-Sheet 1

INVENTOR.
Scott B. Kilner
BY
ATTORNEY.

Dec. 29, 1959     S. B. KILNER     2,919,175
PROCESS OF RECOVERING URANIUM
Filed Oct. 16, 1944     10 Sheets-Sheet 3

INVENTOR.
Scott B. Kilner
BY
ATTORNEY.

Dec. 29, 1959         S. B. KILNER         2,919,175
PROCESS OF RECOVERING URANIUM
Filed Oct. 16, 1944         10 Sheets-Sheet 4

INVENTOR.
Scott B. Kilner
BY
ATTORNEY.

Dec. 29, 1959  S. B. KILNER  2,919,175
PROCESS OF RECOVERING URANIUM
Filed Oct. 16, 1944  10 Sheets-Sheet 6

INVENTOR.
Scott B. Kilner
BY
ATTORNEY.

Dec. 29, 1959  S. B. KILNER  2,919,175
PROCESS OF RECOVERING URANIUM
Filed Oct. 16, 1944  10 Sheets-Sheet 10

INVENTOR.
Scott B. Kilner
BY
ATTORNEY.

United States Patent Office 2,919,175
Patented Dec. 29, 1959

2,919,175

PROCESS OF RECOVERING URANIUM

Scott B. Kilner, Knoxville, Tenn., assignor to the United States of America as represented by the United States Atomic Energy Commission Application October 16, 1944, Serial No. 558,954

14 Claims. (Cl. 23—14.5)

The present invention relates to processes of recovering uranium from a calutron and more particularly to improvements in certain steps of the process disclosed in the copending application of James M. Carter and Martin D. Kamen, Serial No. 532,159, filed April 21, 1944, which issued as Patent No. 2,758,006 on August 7, 1956.

It is an object of the invention to provide an improved process of reclaiming uranium from a calutron.

Another object of the invention is to provide an improved process of recovering the residue of a uranium compound which has been subjected to treatment in a calutron from the parts of the calutron disposed in the source region thereof upon which the residue is deposited.

A further object of the invention is to provide an improved process of purifying uranium which has been recovered from a calutron.

Another object of the invention is to provide a process of reclaiming uranium from a wash solution derived from a calutron, in which the uranium is precipitated as an insoluble uranium compound away from cyanide complex ions of metal impurities in the wash solution.

A still further object of the invention is to provide a process of reclaiming uranium from a wash solution derived from a calutron, in which the uranium is precipitated as an ammonium or alkali metal diuranate away from cyanide complex ions of metal impurities in the wash solution.

A still further object of the invention is to provide a process of reclaiming uranium from a wash solution derived from a calutron, in which the uranium is precipitated as uranous hydroxide away from cyanide complex ions of metal impurities in the wash solution.

Figure 1:
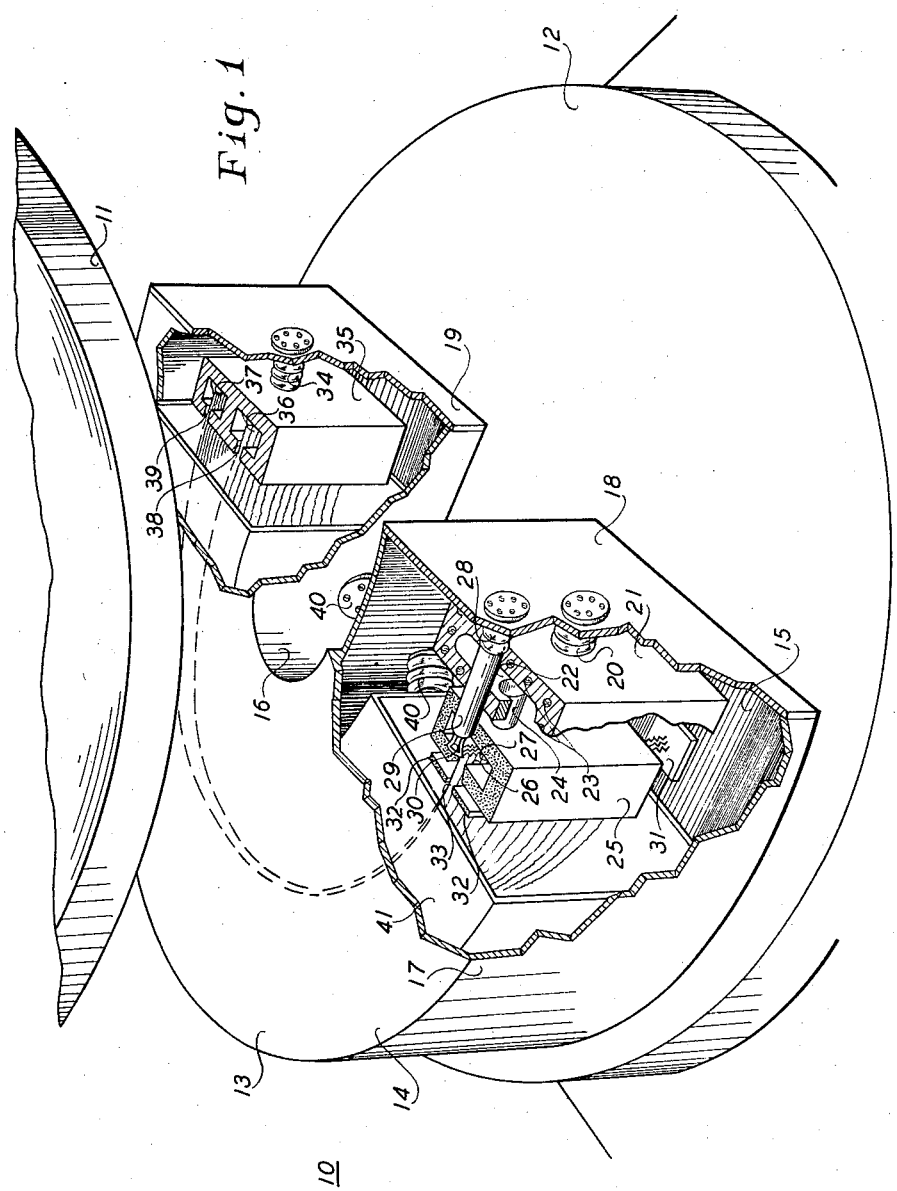
Figure 2:
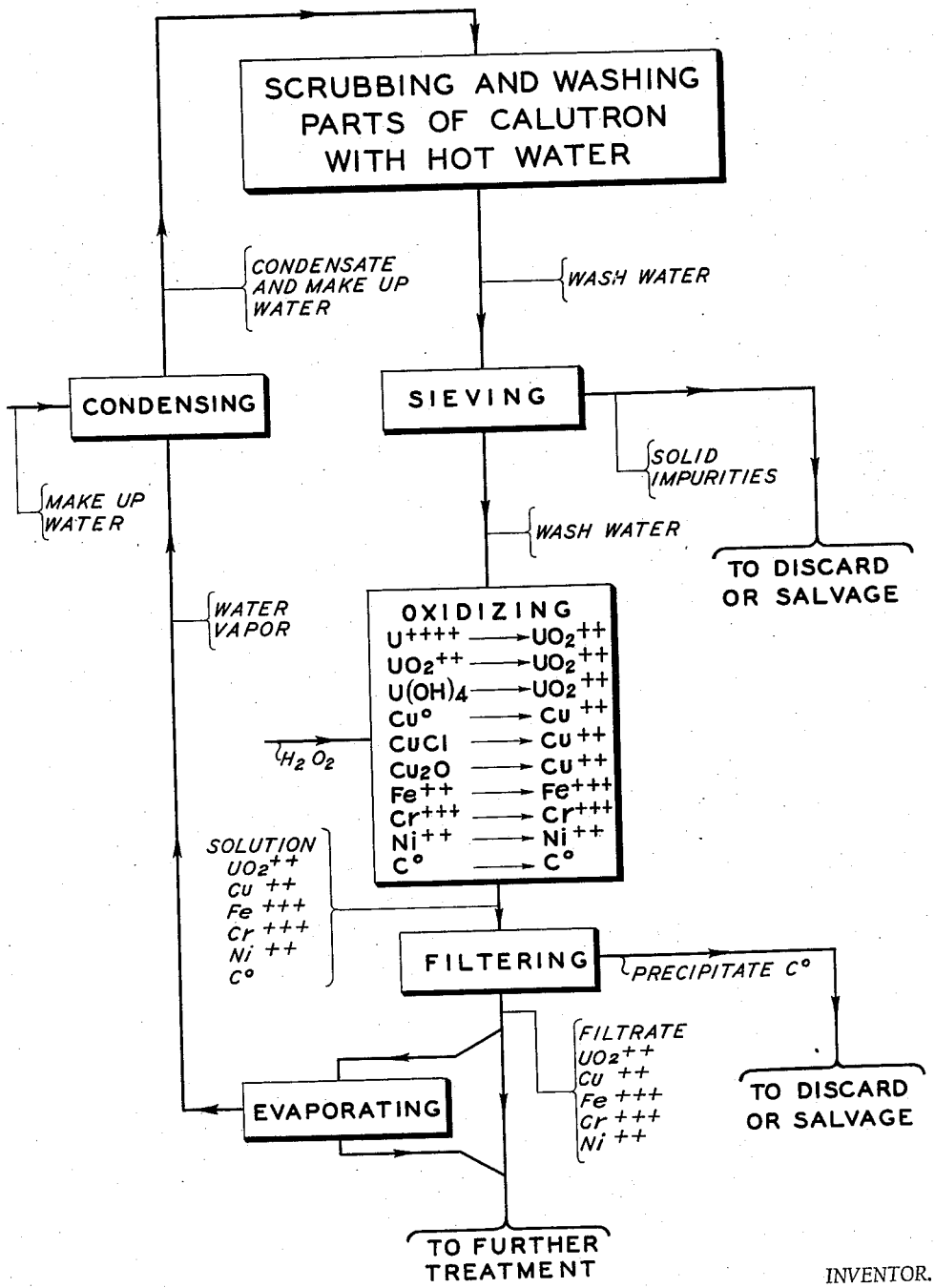
Figure 3:
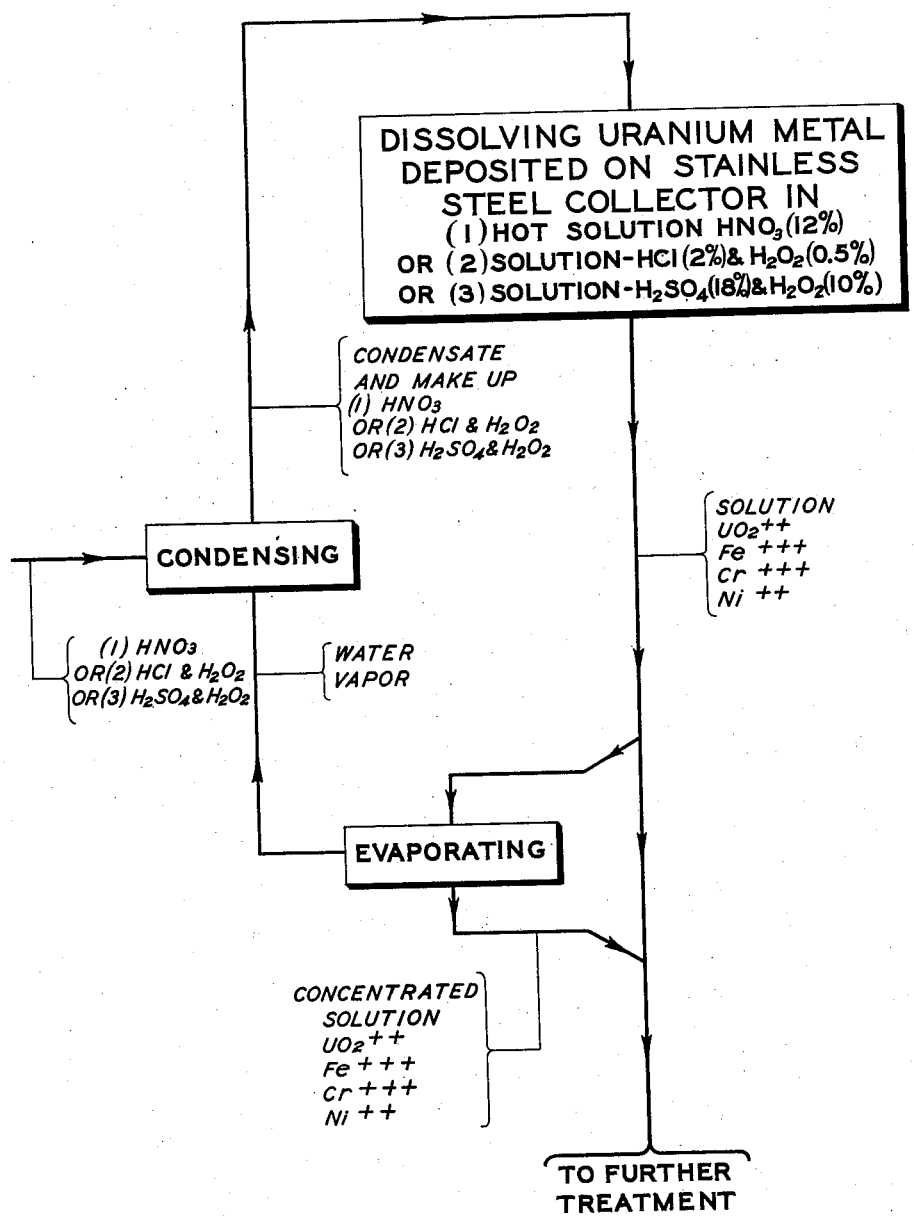
Figure 4:
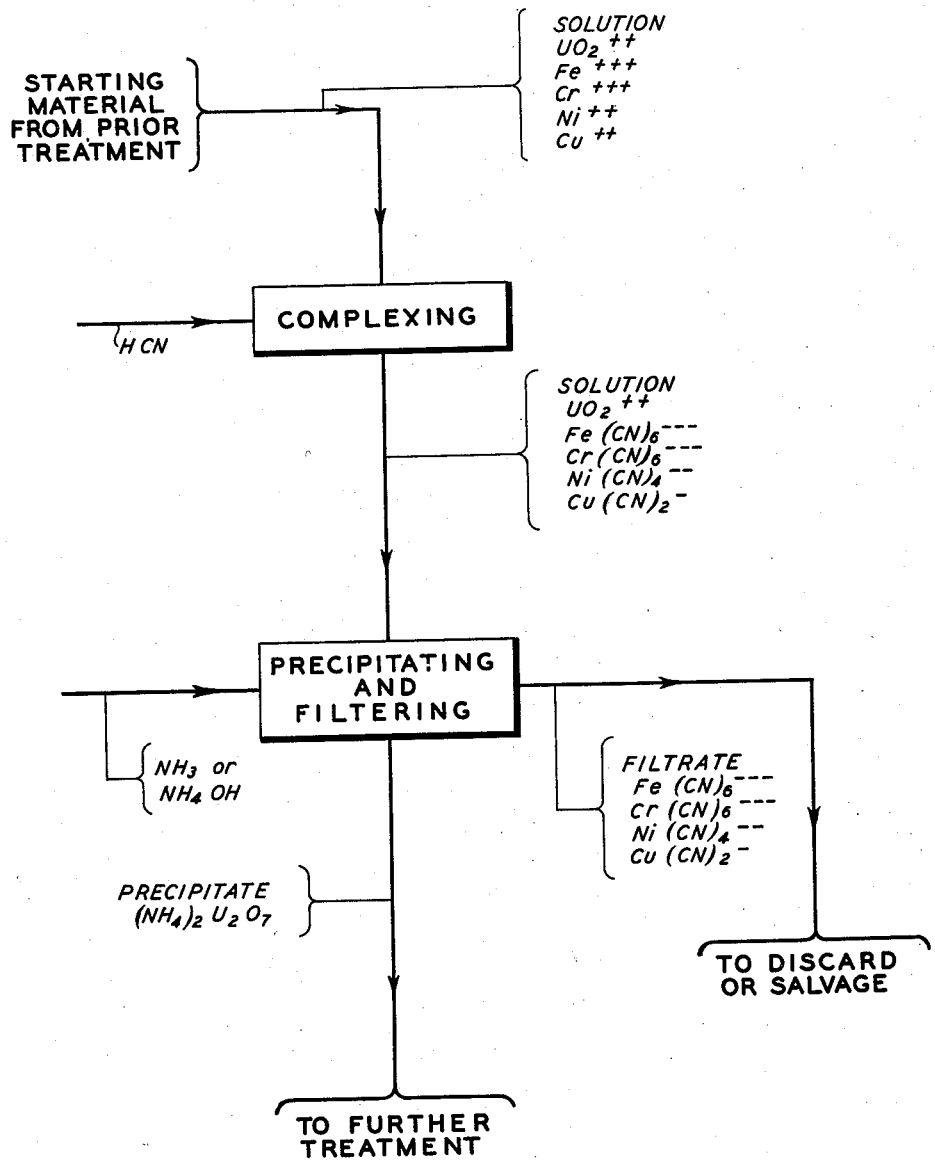
Figure 10:
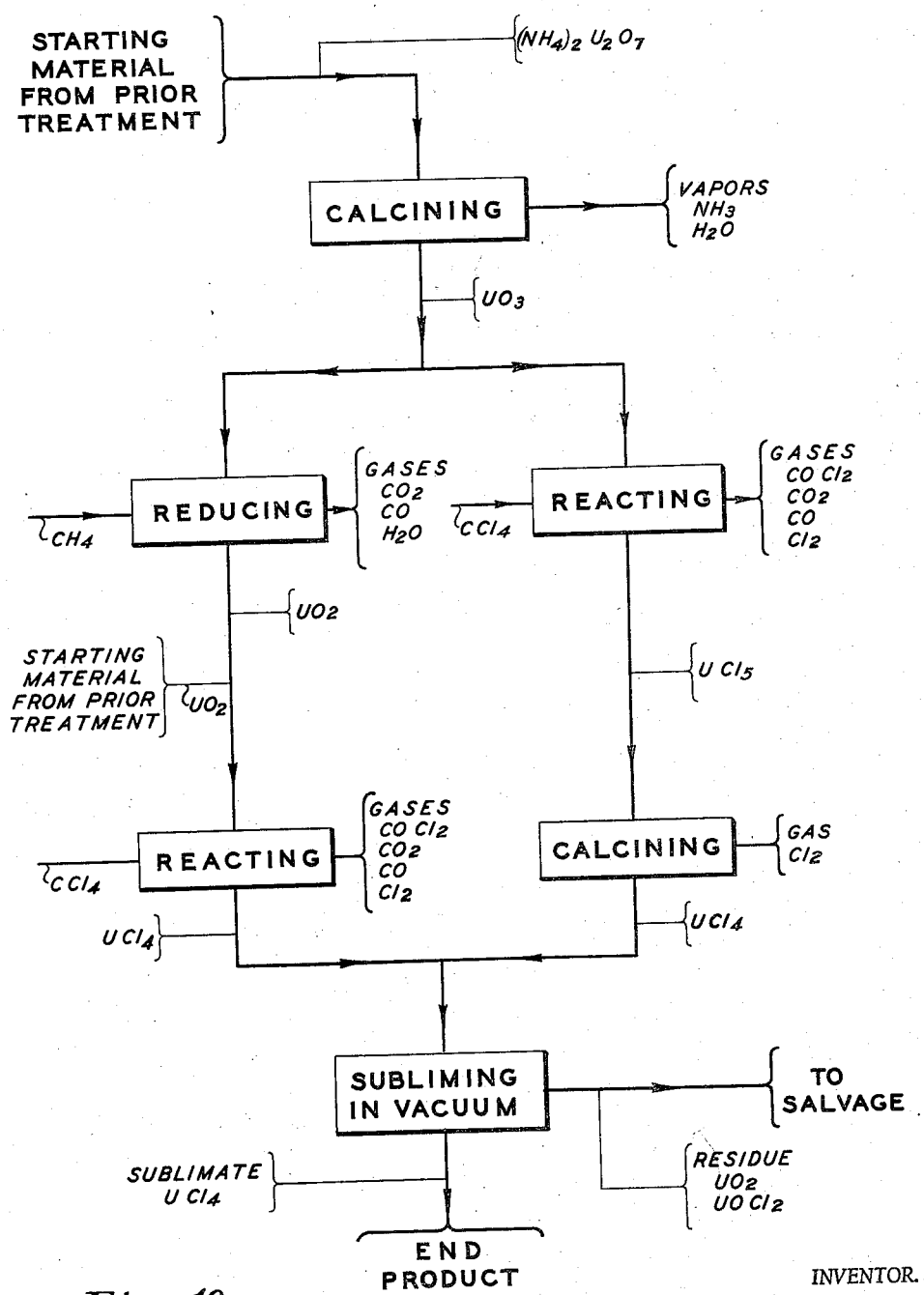

The invention, both as to its organization and method of operation, together with further objects and advantages thereof, will best be understood by reference to the following specification taken in connection with the accompanying drawings in which Figure 1 is a perspective view, partly broken away, of a calutron in conjunction with which there may be carried out the process of the present invention; Fig. 2 illustrates a portion of the flow diagram of the present process, indicating the recovery of the residue of UCl₄ from the parts of the calutron disposed in the source region thereof upon which it is deposited; Fig. 3 illustrates another portion of the flow diagram of the present process, indicating the recovery of the metallic uranium from the collector of the calutron upon which it is deposited; Figs. 4 to 9 illustrate further portions of the flow diagram of the present process, indicating various modifications in procedure for the purification of the recovered uranium; and Fig. 10 illustrates a still further portion of the flow diagram of the present process, indicating the ultimate conversion of the purified uranium back to UCl₄.

At the outset, it is noted that a "calutron" is a machine of the character of that disclosed in the copending application of Ernest O. Lawrence, Serial No. 557,784, filed October 9, 1944 which issued as Patent No. 2,709,222 on May 24, 1955, and is employed to separate the constituent isotopes of an element and more particularly to increase the proportion of a selected isotope in an element containing a plurality of isotopes in order to produce the element enriched with the selected isotope.

Such a calutron essentially comprises means for vaporizing a quantity of material containing an element which is to be enriched with a selected one of the several isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electromagnetic means for deflecting the ions along curved paths, the radii of curvature of the paths of ions being proportional to the square roots of the masses of the ions, whereby the ions are concentrated in accordance with their masses; and means for de-ionizing and collecting the ions of the selected isotope thus concentrated, thereby to produce a deposit of the element enriched with the selected isotope.

Referring now more particularly to Fig. 1, there is illustrated a typical example of a calutron 10 of the character noted, which comprises magnetic field structure including upper and lower pole pieces 11 and 12, provided with substantially flat parallel spaced-apart pole faces, and a tank 13 disposed between the pole faces of the pole pieces 11 and 12. The pole pieces 11 and 12 carry windings, not shown, which are adapted to be energized in order to produce a substantially uniform and relatively strong magnetic field therebetween, which magnetic field passes through the tank 13 and the various parts housed therein. The tank 13 is of tubular configuration, being substantially crescent-shaped in plan, and comprising substantially flat parallel spaced-apart top and bottom walls 14 and 15, upstanding curved inner and outer walls 16 and 17, and end wall 18 and 19. The end walls 18 and 19 close the opposite ends of the tubular tank 13 and are adapted to be removably secured in place, whereby the tank 13 is hermetically sealed. Also, vacuum pumping apparatus, not shown, is associated with the tank 13, whereby the interior of the tank 13 may be evacuated to a pressure of the order of $10^{-5}$ to $10^{-4}$ mm. Hg. Preferably, the component parts of the tank 13 are formed of steel, the bottom wall 15 thereof resting directly upon the pole face of the lower pole piece 12, and the top wall 14 thereof being spaced a suitable distance from the pole face of the upper pole piece 11, whereby the top and bottom walls 14 and 15 constitute in effect pole pieces with respect to the interior of the tank 13, as explained more fully hereinafter.

The removable end wall 18 carries an insulator 20 which supports an upstanding charge block 21, provided with a hollow central cavity 22 constituting a charge receiving pocket surrounded by rather thick side walls. Electrical heating elements 23 are embedded in the side walls of the charge block 21 and are adapted to be connected to a suitable source of current, whereby the charge block 21 may be appropriately heated, the charge block 21 being formed of cast steel or the like. Also, the charge block 21 is provided with a removable cover, not shown, and supports a tubular member 24 which in turn supports an arc block 25 formed of carbon or graphite. The arc block 25 is substantially C-shaped in plan, an upstanding slot 26 being formed in the wall thereof remote from the charge block 21. Thus, the arc block 25 is of hollow construction, having a central arc cavity 27 formed therein, the arc cavity 27 formed in the arc block 25 communicating through the tubular member 24 with the cavity 22 formed in the charge block 21.

Also, the removable end wall 18 carries an insulator 28, disposed above the insulator 20, which supports horizontally projecting cathode structure 29, including a filamentary cathode 30 adapted to be connected to a suitable source of current. The cahode structure 29 projects over the upper end of the charge block 21, whereby the filamentary cathode 30 overhangs and is aligned with respect to the upper end of the cavity 27 formed in the arc block 25. Further, an anode 31 is arranged below and in alignment with respect to the lower end of the cavity 27 formed in the arc block 25, the anode 31 being supported by the charge block 21. The filamentary cathode 30 and the cooperating anode 31 are adapted to be connected to a suitable source of current.

Ion accelearting structure, including a pair of upstanding plates 32 formed of carbon or graphite, is supported by insulating structure, not shown, carried by the removable end wall 18. The pair of upstanding plates 32 are arranged in spaced-apart relation in order to define a slit 33 therebetween, arranged in substantial alignment with respect to the slot 26 formed in the wall of the arc block 25. A suitable source of voltage is adapted to be connected between the arc block 25 and the ion accelerating structure, including the plates 32, for a purpose more fully explained hereinafter.

The removable end wall 19 carries an insulator 34 which supports an upstanding collector block 35 formed of stainless steel or the like and provided with two laterally spaced-apart cavities or pockets 36 and 37 which communicate with aligned slots 38 and 39 formed in the wall of the collector block 35 disposed remote from the removable end wall 19. Alternatively, the collector block may be fabricated of steel plate and the inner surfaces of the pockets 36 and 37 lined with stainless steel plates. It is noted that the pockets 36 and 37 are adapted to receive two constituent isotopes of an element which have been separated in the calutron 10, as explained more fully hereinafter. Finally, the inner wall 16 carries a number of insulators 40 which support a tubular liner 41 formed of copper or the like, rectangular in vertical cross section, disposed within the tank 13 and spaced from the walls 14, 15, 16 and 17 thereof. One end of the tubular liner 41 terminates adjacent the accelerating structure, including the plates 32; and the other end of the tubular liner 41 terminates adjacent the collector block 35; the tubular liner 41 constituting an electrostatic shield for the high-velocity ions traversing the curved paths between the slit 33 formed by the plates 32 of the ion accelerating structure and the slots 38 and 39 formed in the collector block 35, as explained more fully hereinafter.

In view of the above description, it will be understood that the parts of the calutron 10 carried by the removable end wall 18 constitute a source unit, and the end of the tank 13 disposed adjacent the source unit constitutes the source region of the calutron. Similarly, the parts of the calutron carried by the removable end wall 19 constitute a collector unit, and the end of the tank 13 disposed adjacent the collector unit constitutes the collector region of the calutron.

Considering now the general principle of operation of the calutron 10, a charge comprising a compound of the element to be treated is placed in the charge pocket 22 in the charge block 21, the compound of the element mentioned being one which may be readily vaporized. The cover, not shown, is then secured on the charge block 21 and the end walls 18 and 19 are securely attached to the open ends of the tank 13, whereby the tank 13 is hermetically sealed. The various electrical connections are completed and operation of the vacuum pumping apparatus, not shown, associated with the tank 13 is initiated. When a pressure of the order of $10^{-5}$ to $10^{-4}$ mm. Hg is established within the tank 13, the electric circuits for the windings associated with the pole pieces 11 and 12 are closed and adjusted, whereby a predetermined magnetic field is established therebetween, traversing the tank 13. The electric circuit for the heating elements 23 is closed, whereby the charge in the charge pocket 22 in the charge block 21 is heated and vaporized. The vapor fills the charge pocket 22 and is conducted through the tubular member 24 into the cavity 27 formed in the arc block 25. The electric circuit for the filamentary cathode 30 is closed, whereby the filamentary cathode 30 is heated and rendered electron-emissive. Then the electric circuit between the filamentary cathode 30 and the anode 31 is closed, whereby an arc discharge is struck therebetween, electrons proceeding from the filamentary cathode 30 to the anode 31. The electrons proceeding from the filamentary cathode 30 to the anode 31 break up the molecular form of the compound of the vapor to a considerable extent, producing positive ions of the element which is to be enriched with a selected one of its isotopes.

The electric circuit between the arc block 25 and the ion accelerating structure, including the plates 32, is completed, the plates 32 being at a high negative potential with respect to the arc block 25, whereby the positive ions are attracted and accelerated to the voltage impressed between the arc block 25 and the ion accelerating structure. More particularly, the positive ions proceed from the interior of the cavity 27 formed in the arc block 25, through the slot 26 formed in the wall thereof, and across the space between the plates 32 and the adjacent wall of the arc block 25, and thence through the slit 33 formed between the plates 32 into the interior of the tubular liner 41. The high-velocity positive ions form a vertical upstanding ribbon proceeding from the cavity 27 formed in the arc block 25 through the slot 26 and the aligned slit 33 into the tubular liner 41.

The collector block 35, as well as the tubular liner 41, is electrically connected to the ion accelerating structure, including the plates 32, whereby there is an electric field-free path for the high velocity positive ions, disposed between the plates 32 and the collector block 35 within the tubular liner 41. The high-velocity positive ions entering the adjacent end of the liner 41 are deflected from their normal straight-line path and form a vertical plane, passing through the slot 26 and the slit 33, due to the effect of the relatively strong magnetic field maintained through the space within the tank 13 and the liner 41 through which the positive ions travel, whereby the positive ions prescribe arcs, the radii of which are proportional to the square roots of the masses of the ions and consequently of the isotopes of the element mentioned. Thus, ions of the relatively light isotope of the element describe an interior arc of relatively short radius and are focused through the slot 38 into the pocket 36 formed in the collector block 35; whereas ions of the relatively heavy isotope of the element describe an exterior arc of relatively long radius and are focused through the slot 39 into the pocket 37 formed in the collector block 35. Accordingly, the ions of the relatively light isotope of the element are collected in the pocket 36 and are de-ionized to produce a deposit of the relatively light isotope of the element therein, while the ions of the relatively heavy isotope of the element are collected in the pocket 37 and de-ionized to produce a deposit of the relatively heavy isotope of the element therein.

After all of the charge in the charge pocket 22 formed in the charge block 21 has been vaporized, all of the electric circuits are interrupted and the end wall 18 is removed so that another charge may be placed in the pocket 22 and subsequently vaporized in the manner explained above. After a suitable number of charges have been vaporized in order to obtain appropriate deposits of the isotopes of the element in the pockets 36 and 37 of the collector block 35, the end wall 19 may be removed and the deposits of the collected isotopes in the pockets 36 and 37 in the collector block 35 may be reclaimed.

Of course, it will be understood that the various dimensions of the parts of the calutron 10, the various electrical potentials applied between the various electrical parts thereof, as well as the strength of the magnetic field between the pole pieces 11 and 12, are suitably correlated with respect to each other, depending upon the mass numbers of the several isotopes of the element which is to be treated therein.

During the operation of the calutron 10 the compound $UCl_4$ is vaporized in the charge block 21 and conducted through the tubular member 24 into the cavity 27 formed in the arc block 25, where it is subjected to ionization as previously explained. Only a minor fraction (about 5%) of the $UCl_4$ vapor is actually ionized in the cavity 27 formed in the arc block 25 and drawn through the slot 26 due to the ion accelerating structure, including the plates 32. The major fraction (about 95%) of the $UCl_4$ vapor is un-ionized in the cavity 27 formed in the arc block 25 and flows through the slot 26 due to the pressure differential between the cavity 27 and the interior of the liner 41. This major fraction of the $UCl_4$ vapor, being un-ionized, is not at all affected by the ion accelerating structure, including the plates 32, and travels into contact with the various parts of the calutron disposed in the source region thereof, upon which parts it is condensed primarily in the compound form $UCl_4$ as a residue. More particularly, this residue is condensed principally upon the interior of the adjacent end of the liner 41, but to some extent upon the exterior thereof, the walls of the tank 13 in the region of the source and upon the exterior surfaces of the various elements of the source unit including the arc block 25, the charge block 21, etc.

More particularly, the minor fraction of the $UCl_4$ vapor is ionized to form positive atomic ions including $U^+$, $U^{++}$, $Cl^+$ and $Cl^{++}$; and positive molecular ions including $Cl_2^+$, $Cl_2^{++}$, $UCl_4^+$, $UCl_4^{++}$, $UCl_3^+$, $UCl_3^{++}$, $UCl_2^+$, $UCl_2^{++}$, $UCl^+$ and $UCl^{++}$.

Accordingly, it will be understood that, after operation of the calutron 10 to vaporize a reasonable number of charges of $UCl_4$ in the charge block 21, a considerable deposit of $UCl_4$ is formed on the adjacent end of the liner 41, and that a reasonable deposit of metallic uranium, as well as the various uranium chlorides, is formed on the intermediate portion of the liner 41.

The residue of $UCl_4$ deposited on the parts of the calutron disposed in the source region thereof, principally upon the liner, is recovered by a water wash process, whereby various impurities including copper, iron, chromium, nickel and carbon are introduced in the wash solution, due to the fact that the various parts of the calutron which are thus washed with water are formed of the materials mentioned. Accordingly, the wash solution containing natural or normal uranium which has been reclaimed, contains considerable impurities.

Considering now the details of the recovery of the $UCl_4$ residue from the parts of a calutron disposed in the source region thereof, reference is made to the portion of the flow diagram illustrated in Fig. 2. The parts of the calutron disposed in the source region thereof, principally the source-region end of the liner, are scrubbed and washed with hot water, whereby the residue of $UCl_4$ deposited thereon is dissolved; and various impurities, including copper, iron, chromium, nickel and carbon, are introduced in the water wash, due to the fact that the various parts of the calutron which are thus washed with hot water are formed of the materials mentioned. The wash water is then sieved in order to remove any solid impurities which may be picked up, such, for example, as small pieces of metal and carbon. These solid impurities may be either discarded or subjected to salvage treatment in order to recover any occluded uranium. The sieved wash water is then treated with $H_2O_2$ by adding a slight excess of 10% $H_2O_2$ and agitating the solution in order to oxidize the various contained materials. For example, prior to the step of oxidation the wash water may contain suspended $U(OH)_4$ and bits of copper and carbon; dissolved uranium in the $+4$ and $+6$ valence states, as well as dissolved copper, iron, nickel, chromium and possibly other metals in one or more of the positive valence states. Hence, as a result of oxidation all of the uranium is put in solution as uranyl ion, suspended copper is put in solution as cupric ion, and other dissolved materials are put in their higher stable valence states, if they are not already in such state. Carbon is not oxidized by this treatment. The effect of the oxidation on the various materials contained in the wash solution may be indicated as follows:

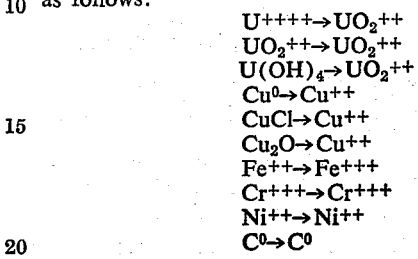

$$U^{++++} \rightarrow UO_2^{++}$$
$$UO_2^{++} \rightarrow UO_2^{++}$$
$$U(OH)_4 \rightarrow UO_2^{++}$$
$$Cu^0 \rightarrow Cu^{++}$$
$$CuCl \rightarrow Cu^{++}$$
$$Cu_2O \rightarrow Cu^{++}$$
$$Fe^{++} \rightarrow Fe^{+++}$$
$$Cr^{+++} \rightarrow Cr^{+++}$$
$$Ni^{++} \rightarrow Ni^{++}$$
$$C^0 \rightarrow C^0$$

Accordingly, the oxidized wash water contains at least the following: $UO_2^{++}$, $Cu^{++}$, $Fe^{+++}$, $Cr^{+++}$, $Ni^{++}$ and $C^0$ (carbon). The oxidized wash water is then filtered in order to remove $C^0$, which may be discarded or subjected to salvage treatment in order to recover any occluded uranium.

In the event this filtrate is rather dilute, it may be concentrated by evaporation; otherwise, this step is omitted. In the event the filtrate is concentrated by evaporation, the water vapor which is driven off is condensed and to it is added enough makeup water in order to provide a new wash solution, which is used again to wash the parts of the calutron disposed in the source region thereof, in the manner previously explained. This step, comprising condensing and re-using the water vapor which is driven off the filtrate incident to concentration by evaporation, is advantageous in view of the fact that any uranium entrained in the water vapor is not lost to the outside. The original filtrate mentioned above, or the concentrated filtrate following evaporation, in the event this step is employed, is then stored for further treatment.

Considering now the details of the recovery of the metallic uranium from the pocket of the collector of the calutron, reference is made to the portion of the flow diagram illustrated in Fig. 3. The inner surfaces of the pocket of the collector of the calutron are etched with one of a number of acid solutions, whereby the deposit of metallic uranium, is dissolved; and various impurities including iron, chromium and nickel are introduced in the acid wash solution, due to the fact that the inner surfaces of the first pocket of the collector of the calutron which are thus etched with the acid solution are formed of stainless steel which comprises the materials mentioned. Accordingly, the wash acid contains at least the following ions: $UO_2^{++}$, $Fe^{+++}$, $Cr^{+++}$, and $Ni^{++}$.

A suitable acid wash solution which may be employed for the purpose mentioned comprises an aqueous solution containing $HNO_3$ (approximately 12%). Another suitable acid wash solution comprises an aqueous solution containing $HCl$ (approximately 2%) and $H_2O_2$ (approximately 0.5%). A further suitable acid wash solution comprises an aqueous solution containing $H_2SO_4$ (approximately 18%) and $H_2O_2$ (approximately 10%). Thus, it will be understood that the first acid wash solution comprises an oxidizing acid, whereas the second and third acid wash solutions comprise a separate oxidizing agent in the form of $H_2O_2$. Hence, the acid wash solution employed in any case produces an oxidizing effect upon both the uranium and the metal impurities which are dissolved therein.

In the event the wash acid is rather dilute in the ions mentioned, it may be concentrated by evaporation; otherwise this step is omitted. In the event the wash acid is concentrated by evaporation, the vapor which is driven off is condensed and to it is added enough makeup $HNO_3$, or HCl and $H_2O_2$, or $H_2SO_4$ and $H_2O_2$, depending upon the composition of the original wash acid employed, in order to provide a new wash acid which is again used to wash the pocket of the collector of the calutron, in the manner previously explained. This step, comprising condensing the vapor which is driven off the wash acid incident to concentration by evaporation, is advantageous in view of the fact that any uranium entrained in the vapor is not lost to the outside. The original wash acid mentioned above, or the concentrated wash acid following evaporation, in the event this step is employed, is then stored for further treatment.

Considering now the purification of one of the composite solutions described above, comprising the following ions: $UO_2^{++}$, $Fe^{+++}$, $Cr^{+++}$, $Ni^{++}$ and $Cu^{++}$, a number of different purification procedures are possible, as described in detail hereinafter. All of the procedures, however, are based upon the feature of separating uranium in one form or another from a solution in which the metal impurities are retained in the form of soluble cyanide complexes and in which the uranium is present in solution in either the +6 ($UO_2^{++}$) or the +4 ($U^{++++}$) oxidation state.

CYANIDE COMPLEXING APPLIED TO COMPOSITE SOLUTIONS CONTAINING URANIUM AS $UO_2^{++}$

A. Referring to the portion of the flow diagram illustrated in Fig. 4, the solution is subjected to a cyanide-hydroxide treatment, whereby cyanide complex ions of the metal impurities are produced and the uranium is precipitated as $(NH_4)_2U_2O_7$. More specifically, the treatment preferably comprises introducing an excess of HCN (either as a gas or a liquid) into the solution in an enclosed gas-tight vessel in order to complex the contained metal impurities, and then introducing sufficient ammonia (either in the form of carbonate-free $NH_3$ gas or as carbonate-free $NH_4OH$) into the solution while agitating, whereby the pH of the solution is rendered greater than about 13, and $(NH_4)_2U_2O_7$ is precipitated.

Thus, the following cyanide complex ions are produced in the solution:

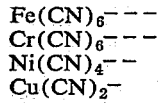

This complexing of the iron and chromium impurities in the solution as ferricyanide ion and chromic cyanide complex ion prevents precipitation of the impurities mentioned when the solution is subsequently subjected to treatment with ammonia, and accordingly the uranium is precipitated as ammonium diuranate away from the metal impurities which are retained in solution.

The mixture is then filtered and the ammonium diuranate precipitate is washed with an aqueous solution containing about one percent $NH_4OH$ and one percent $NH_4NO_3$ in order to substantially eliminate occluded cyanide complex ions of the iron, chromium, nickel and copper. The filtrate containing the cyanide complex ions of iron, chromium, nickel, and copper is then discarded or subjected to salvage treatment in order to recover any uranium contained therein, and the purified $(NH_4)_2U_2O_7$ precipitate is stored for further treatment.

B. According to another modification, as illustrated in the portion of the flow diagram shown in Fig. 5, the metal impurities in the composite solution are complexed by treatment with HCN as already described in connection with Fig. 4. Thereafter, however, instead of treating the solution containing the uranium in the form of uranyl ion, $UO_2^{++}$, and the metal impurities in the form of their respective cyanide complex ions, the solution is treated with a carbonate-free alkali metal hydroxide, such as KOH or NaOH, whereupon the uranium is precipitated as the corresponding alkali diuranate, $K_2U_2O_7$ or $Na_2U_2O_7$, the metal impurities that have been complexed by cyanide ion meanwhile remaining in solution.

Figure 5:
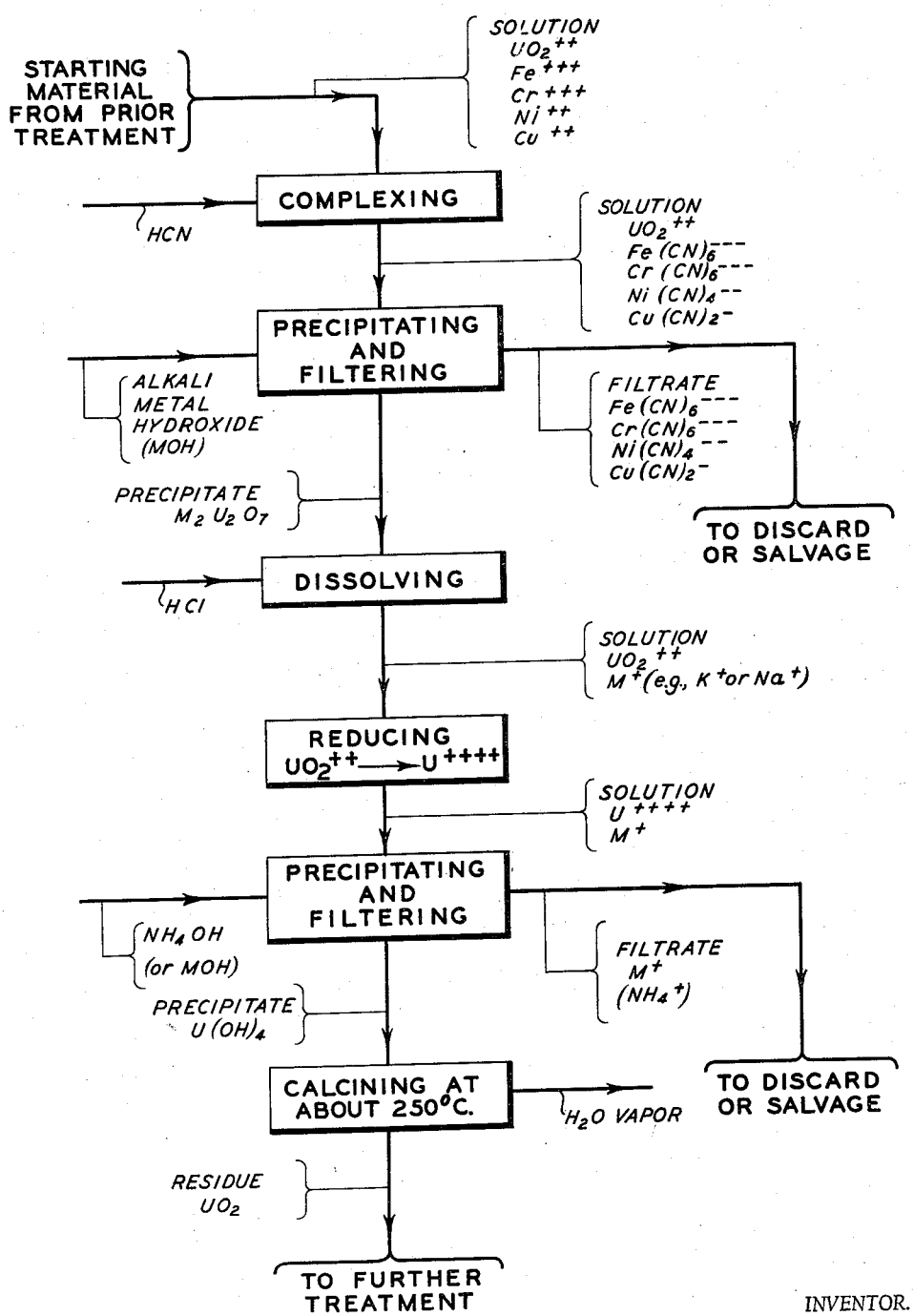
Figure 6:
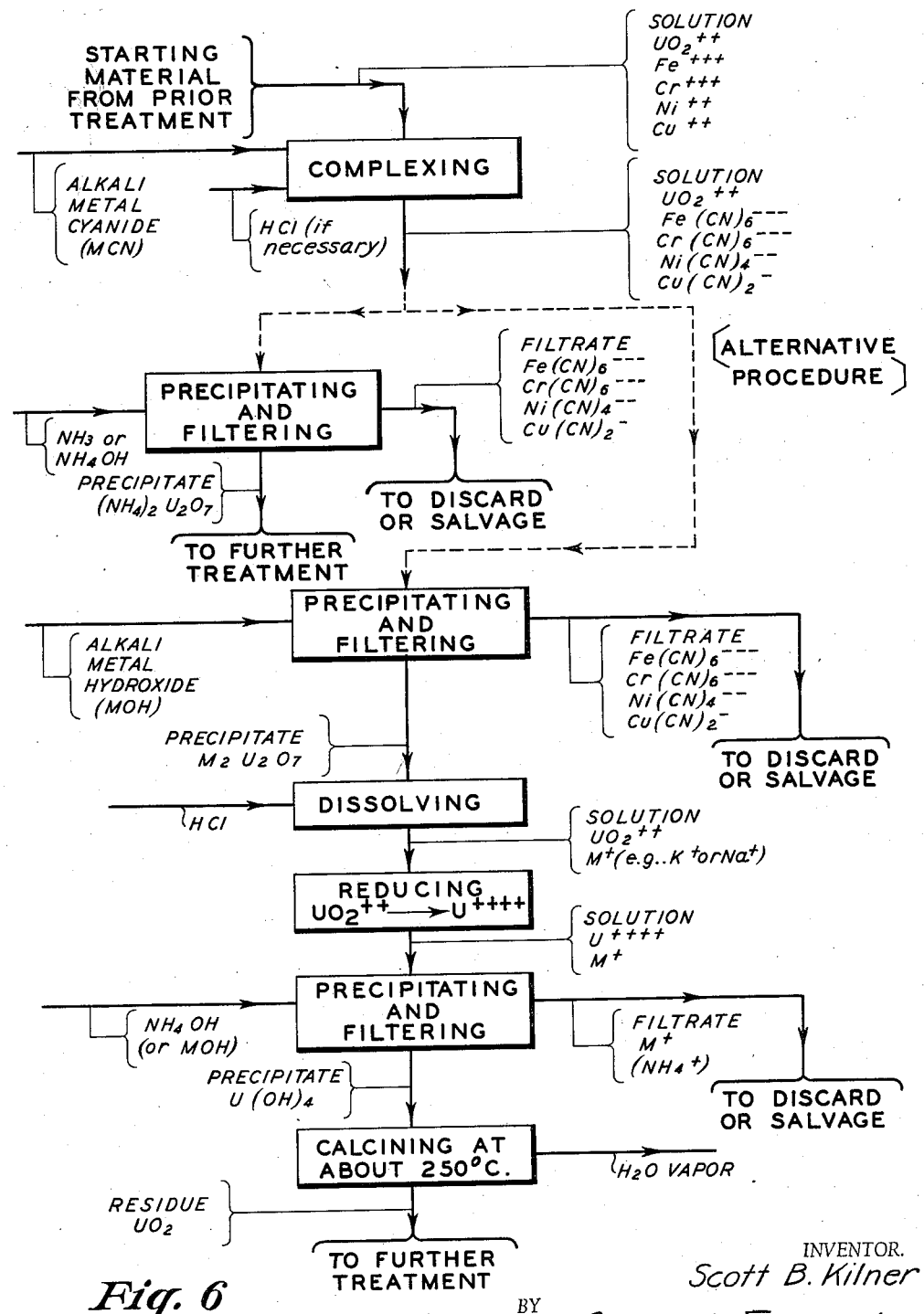
Figure 7:
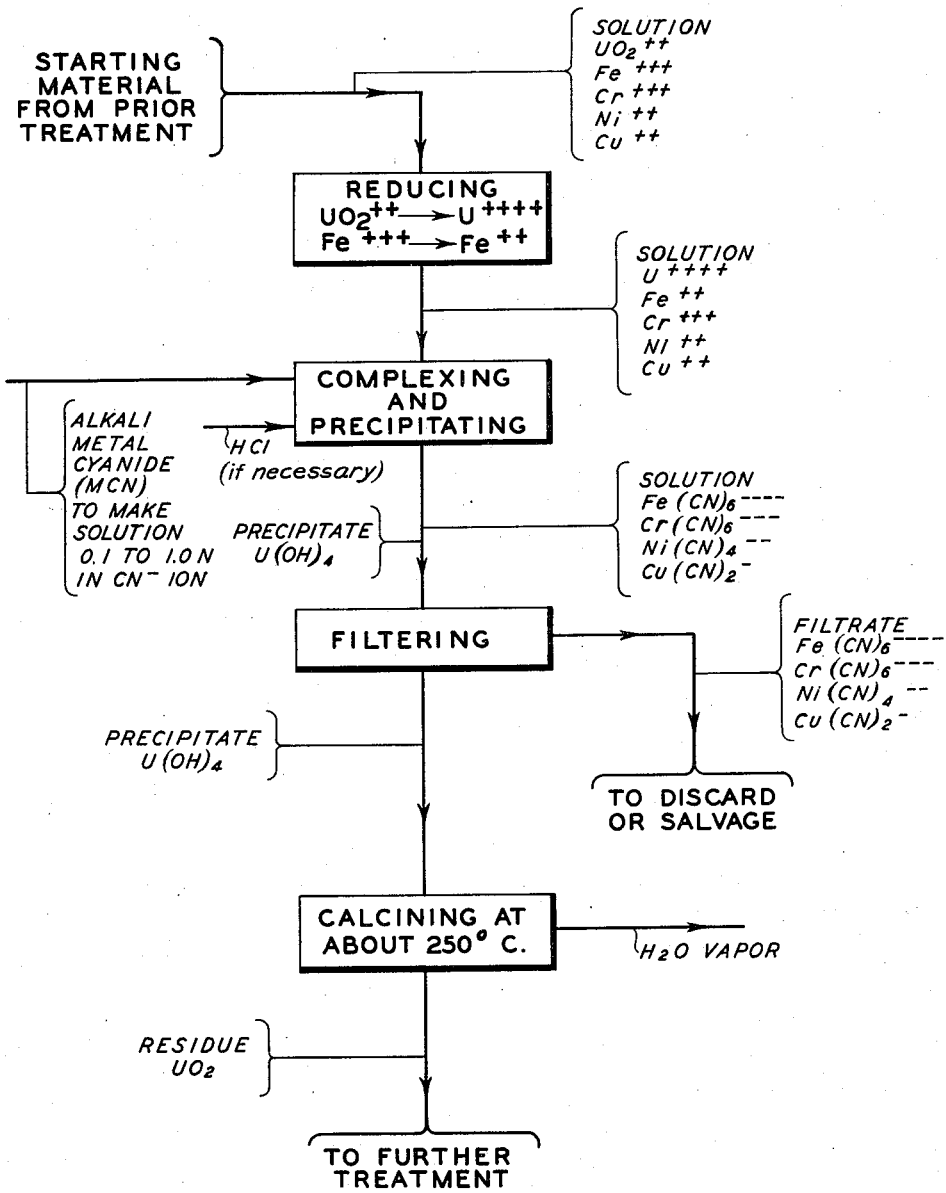

However, when the uranium is thus precipitated away from the metal impurities in the form of potassium or sodium diuranate instead of ammonium diuranate, a slight complication in the procedure is introduced in that this precipitate must be further treated in order to eliminate the potassium or sodium. In order to accomplish this end, as shown in Fig. 5 the $K_2U_2O_7$ or $Na_2U_2O_7$ precipitate is dissolved in an acid such as dilute HCl, resulting in a solution containing $UO_2^{++}$ and $K^+$ or $Na^+$ ions. The solution is then reduced in any suitable manner, whereby the uranium ion is reduced to its lower valence state, $U^{++++}$. For example, the solution may be electrolytically reduced in the manner disclosed in the copending application of Martin D. Kamen and Abel de Haan, Jr., Serial No. 542,378, filed June 27, 1944, which issued as Patent No. 2,771,340 on November 20, 1956.

The reduced solution now contains $U^{++++}$ and $K^+$ or $Na^+$ ions and is then treated with a carbonate-free ammonium or alkali metal hydroxide in order to precipitate the uranium as $U(OH)_4$ away from the potassium or sodium in the solution. Preferably carbonate-free ammonium hydroxide is employed for this step in order to avoid further increasing the concentration of alkali metal ion in the solution, since in the event of incomplete removal of occluded cationic material from the precipitated $U(OH)_4$, any ammonium ions that are retained thereon, unlike occluded alkali metal ions, are readily driven off and/or destroyed during the subsequent calcining step, thus promoting the recovery of pure uranium material. Following the addition of hydroxide to the solution, the resulting mixture is filtered and the uranium hydroxide precipitate is washed with an aqueous solution containing about one percent $NH_4OH$ and one percent $NH_4NO_3$, thus carrying any potassium or sodium ions that might be occluded thereon into the filtrate. The filtrate containing the $K^+$ or $Na^+$ ion is discarded or subjected to salvage treatment in order to recover any remaining traces of uranium that might be contained therein, and the $U(OH)_4$ is then calcined at approximately 250° C. in order to produce $UO_2$, water vapor being given off incident to the calcination. The $UO_2$ is then stored for further treatment or commercial use.

C. Instead of treating the composite solution with hydrogen cyanide and ammonia or alkali metal hydroxide in the manner described above, as illustrated in the portion of the flow diagram shown in Fig. 6 the solution may be first treated with a strong alkali metal cyanide, such as KCN or NaCN, in order to produce cyanide complex ions of the metal impurities without precipitation of the uranium, care being taken during this step to maintain the solution under conditions of sufficient acidity to prevent the hydroxides of the metal impurities from precipitating, such as by adding an acid such as HCl to the solution prior to adding all the alkali cyanide required for complete complexing of the metal impurities, or if some hydroxide precipitate is inadvertently formed, by adding an acid such as HCl to the solution to redissolve same prior to, or after, the required amount of alkali cyanide for complexing has been added.

After the metal impurities have been complexed with the alkali cyanide, the solution is subsequently treated with ammonia (either in the form of carbonate-free $NH_3$ gas or carbonate-free $NH_4OH$) or with a carbonate-free alkali hydroxide such as KOH or NaOH, thereby precipitating the uranium as $(NH_4)_2U_2O_7$ or $K_2U_2O_7$ or $Na_2U_2O_7$, respectively, away from the metal impurities in the solution. The mixture is then filtered and the precipitate of ammounim, potassium or sodium diuranate is then washed, all in the manner previously explained.

When the uranium is precipitated as $(NH_4)_2U_2O_7$, this material may be stored for further treatment. When, however, the uranium is precipitated as $K_2U_2O_7$ or $Na_2U_2O_7$, it is preferably subjected to the treatment already described for the elimination of the potassium or sodium. Both alternatives are fully illustrated in Fig. 6, but since the respective procedures have already been described in detail in connection with Figs. 4 and 5, in the interests of brevity this need not be repeated.

CYANIDE COMPLEXING APPLIED TO COMPOSITE SOLUTIONS CONTAINING URANIUM AS $U^{++++}$

D. In accordance with a further modification in the present process of purifying the uranium, the uranium may be precipitated away from the metal impurities in the solution while the uranium is in a lower valence state, as illustrated in the portion of the flow diagram shown in Fig. 7. More particularly, the oxidized composite solution containing the uranium, iron, chromium, nickel and copper ions in their higher valence states is first reduced in any suitable manner. For example, the solution may be electrolytically reduced under controlled conditions in the manner disclosed in the previously mentioned copending application of Martin D. Kamen and Abel de Haan, Jr. In this case the effect of the reduction upon the various ions is as follows:

$$UO_2^{++} \to U^{++++}$$
$$Fe^{+++} \to Fe^{++}$$
$$Cr^{+++} \to Cr^{+++}$$
$$Ni^{++} \to Ni^{++}$$
$$Cu^{++} \to Cu^{++}$$

The reduced solution is then treated with solid alkali metal cyanide, such as KCN or NaCN, in amount sufficient to render the solution about 0.1 to 1.0 N in $CN^-$ ion, whereby cyanide complex ions of the metal impurities are produced and the uranium is simultaneously precipitated as $U(OH)_4$, some acid (such as HCl) preferably being added prior to the time complete complexing has been obtained, in order to maintain a sufficiently low pH to prevent premature formation of hydroxides of metal impurities which would interfere with the complexing mechanism. In this manner the following cyanide complex ions are produced in the solution:

$$Fe(CN)_6^{----}$$
$$Cr(CN)_6^{---}$$
$$Ni(CN)_4^{--}$$
$$Cu(CN)_2^{-}$$

This complexing of the iron and chromium impurities in the solution as ferrocyanide ion and chromic cyanide complex ion prevents precipitation of the impurities mentioned in the solution, and accordingly the uranium is precpitated as uranous hydroxide away from the metal impurities which are retained in solution.

The mixture is then filtered and the uranous hydroxide precipitate is washed with an aqueous solution containing about one percent $NH_4OH$ and one percent $NH_4NO_3$ in order to substantially eliminate occluded cyanide complex ions of the iron, chromium, nickel, and copper. The filtrate containing the cyanide complex ions of iron, chromium, nickel and copper is then discarded or subjected to salvage treatment in order to recover any remaining traces of uranium that might be contained therein, and the $U(OH)_4$ is then calcined at approximately 250° C. in order to produce $UO_2$, water vapor being given off incident to the calcination. The $UO_2$ is then stored for further treatment or commercial use, as previously noted.

Figure 8:
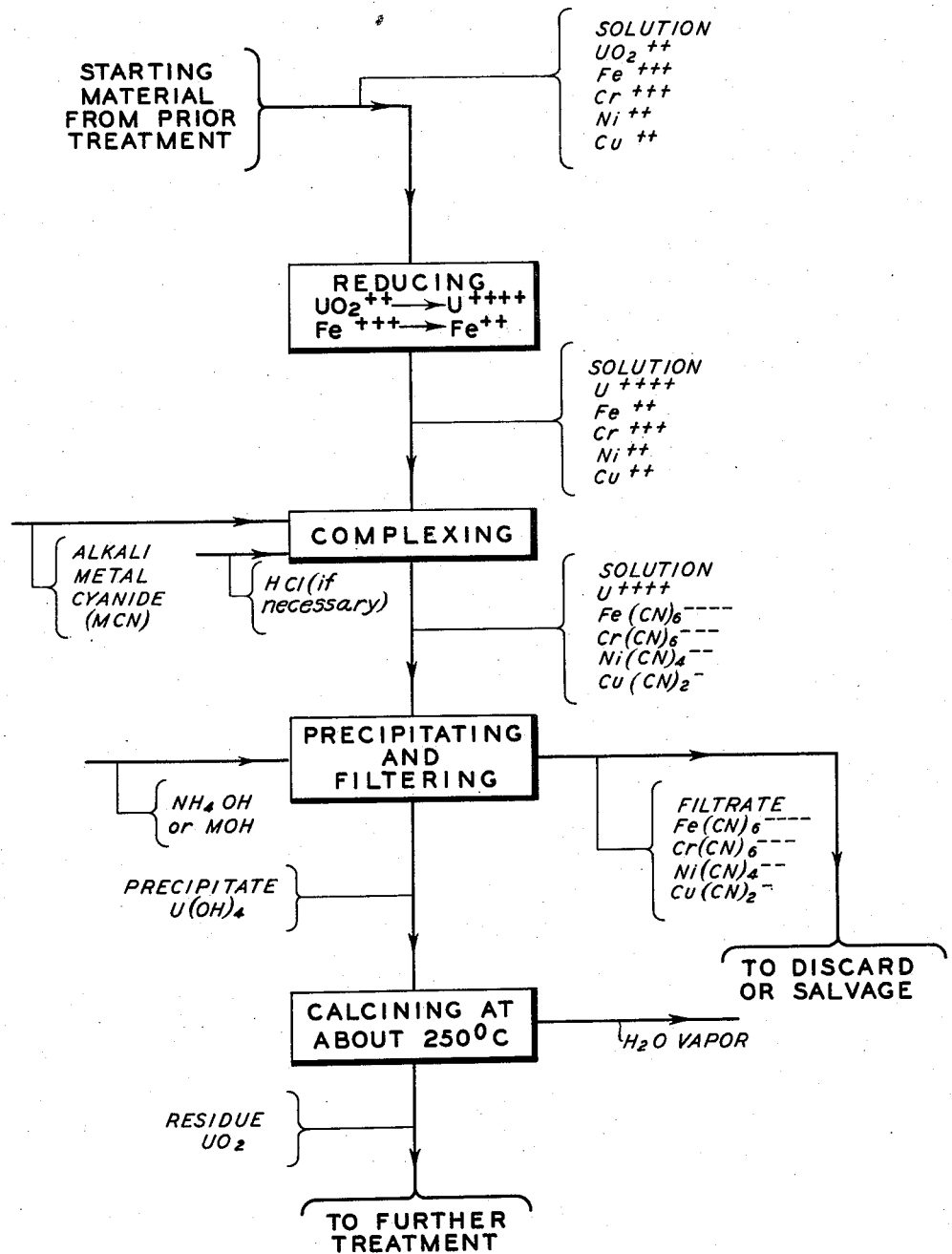
Figure 9:
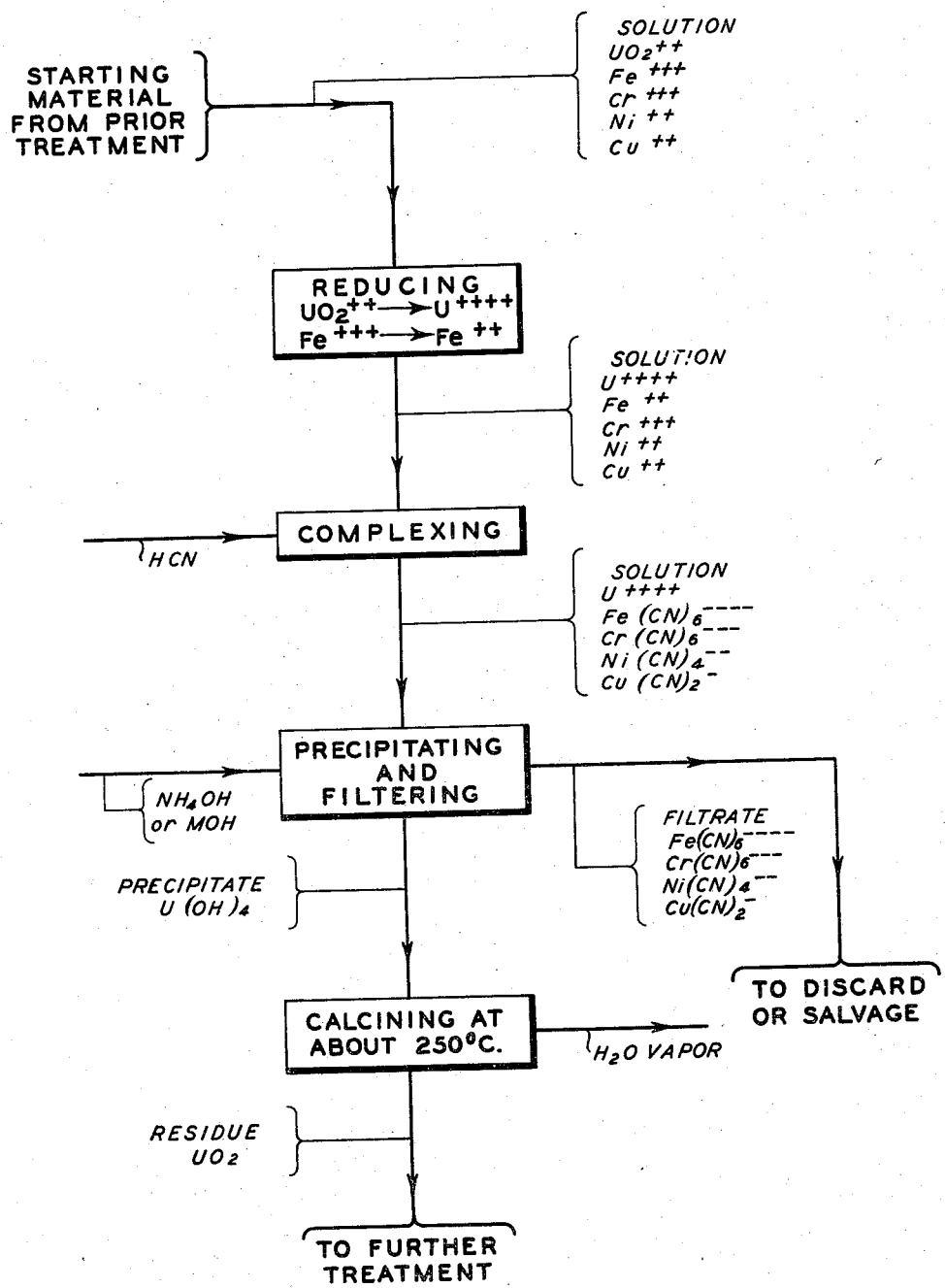

E. Alternatively, as illustrated in the portion of the flow diagram shown in Figure 8 an alkali metal cyanide, such as KCN or NaCN, is added to the composite solution that has been previously reduced (for example, in the manner explained in connection with Fig. 7), in an amount sufficient only to complex the metal impurities (and preferably with the addition of an acid, such as HCl, to maintain a pH low enough to prevent premature precipitation of hydroxides of the metal impurities), followed by the addition of carbonate-free ammonia, either in the form of $NH_3$ gas or $NH_4OH$, or a carbonate-free alkali metal hydroxide, such as KOH or NaOH, to produce a precipitate of $U(OH)_4$ free of the metal impurities that are retained in soluble cyanide complex form in the solution. The subsequent separation of the precipitated $U(OH)_4$ and the conversion thereof to $UO_2$ are illustrated in Fig. 8 and for the sake of brevity, since these steps have already been described in detail, this description need not be repeated.

F. It is also possible to effect the separation of uranium from metal impurities contained in the composite solution as follows, with particular reference to the portion of the flow diagram illustrated in Fig. 9: The reduced composite solution, obtained as described above in connection with Fig. 7, is treated with HCN, either as a liquid or as a gas, in amount sufficient to complex the metal impurities, followed by the addition of carbonate-free ammonia, either as $NH_3$ gas or as $NH_4OH$, or a carbonate-free alkali metal hydroxide, such as KOH or NaOH, in an amount sufficient to precipitate $U(OH)_4$ free of the metal impurities that are retained in soluble cyanide complex form in the solution. The subsequent separation of the precipitated $U(OH)_4$ and the conversion thereof to $UO_2$ are shown in detail in Fig. 9, and for the sake of brevity, since these steps have already been described in connection with other figures, this description need not be repeated.

Considering now the details of the ultimate conversion of either the first batch or the second batch of $(NH_4)_2U_2O_7$ to $UCl_4$, reference is made to the portion of the flow diagram illustrated in Fig. 10. More particularly, a batch of $(NH_4)_2U_2O_7$ is calcined at approximately 300° C. in order to produce $UO_3$, whereby $NH_3$ and water vapor are given off incident to the calcination. The uranium trioxide thus produced may be converted by alternative processes into crude $UCl_4$. In accordance with one process the $UO_3$ is first reduced to $UO_2$ by heating with $CH_4$ at approximately 450° C., whereby $CO_2$, CO and water gases are given off incident to the reduction. The uranium dioxide is then reacted with $CCl_4$ in the vapor phase at approximately 450° C. in a suitable reaction chamber in order to produce crude $UCl_4$, whereby $COCl_2$, $CO_2$, CO and $Cl_2$ gases are given off incident to the reaction. In accordance with an alternative process the $UO_3$ may be reacted directly with $CCl_4$ in the liquid phase in an autoclave at a temperature of approximately 140° to 160° C. and at a pressure of approximately 200 pounds per square inch gauge in order to produce $UCl_5$, whereby $COCl_2$, $CO_2$, CO and $Cl_2$ gases are given off incident to the reaction. The uranium pentachloride thus produced is then calcined or decomposed to produce crude $UCl_4$ by heating to approximately 350° C., whereby $Cl_2$ gas is given off incident to the calcination.

Of course, it will be understood that in the event the alternative procedure of purifying of the uranium described above, wherein $UO_2$ is produced, is employed, the first batch or the second batch of $UO_2$ may be reacted directly with $CCl_4$ in the vapor phase, in order to produce crude $UCl_4$ in the manner described.

In any case, the crude uranium tetrachloride produced by either of the alternative processes indicated above is then sublimed in a suitable molecular still at approximately 600° C. in order to produce a sublimate of $UCl_4$, whereby residues of $UO_2$ and $UOCl_2$ are produced incident to the sublimation. The residues of $UO_2$ and $UOCl_2$ are ultimately converted to $UCl_4$. The $UCl_4$ thus produced is of very pure form and is suitable for recycling in the appropriate one of the first-stage or second-stage calutrons in the manner previously explained. More particularly, the conversion of the first batch of $(NH_4)_2U_2O_7$ or $UO_2$ is productive of a first batch of $UCl_4$ containing uranium of substantially natural or normal composition with reference to $U^{235}$; this batch of $UCl_4$ is recycled in the first-stage calutron. Also, the conversion of the second batch of $(NH_4)_2U_2O_7$ or $UO_2$ is productive of a second bath of $UCl_4$ containing uranium singly enriched with $U^{235}$; this second batch of $UCl_4$ is recycled in the second-stage calutron.

The present process of recovering uranium from wash solutions derived from calutrons is very effective in view of the fact that it is quite versatile. Thus, not only may uranium be reclaimed from a wash solution containing the impurities mentioned, copper, iron, chromium and nickel, but the wash solution may contain a variety of other impurities, such as manganese, zinc, and silver, without adversely affecting the purification. Moreover, the purification can be carried out as explained without particular reference to the identification of the impurities or the proportions contained in the wash solution; this feature is very advantageous in view of the fact that both the particular impurities as well as the related quantities thereof vary considerably among the different wash solutions derived from the different calutrons.

In view of the foregoing it is apparent that there has been provided an improved process of recovering, reclaiming, purifying and converting uranium, both in metallic and compound forms.

Also, it will be understood that the present process may be suitably modified so that a compound of uranium other than $UCl_4$, may be treated in the calutron. For example, the calutron, as well as the conversion steps of the process, may be modified, whereby $UCl_6$, $UBr_4$, etc. may be treated.

The term "uranium" is employed in the present specification and claims in a generic sense, i.e., as applying to uranium whether present in elemental, ionic, or compound form, unless indicated otherwise by the context. Furthermore, the terms "ammonia" and "ammonium hydroxide" are used interchangeably, so that the use of either term is to be construed as covering the use of both substances, unless the contrary is indicated by the context.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. The process of reclaiming uranium from the parts of a calutron composed of metals soluble in the wash solution and upon which uranium is deposited comprising washing the parts mentioned with a solvent for the uranium, whereby metal impurities of a class which forms soluble cyanide complex ion in an haydroxide solution are introduced in the wash solution, treating the wash solution with a soluble cyanide in order to produce cyanide complex ions of the metal impurities, then treating the wash solution with a soluble hydroxide in order to precipitate the uranium as a diuranate away from the metal impurities in the solution, and ultimately separating the diuranate precipitate from the solution.

2. The process of reclaiming uranium from the parts of a calutron composed of metals soluble in the wash solution and upon which uranium is deposited comprising washing the parts mentioned with a solvent for the uranium, whereby metal impurities of a class which forms soluble cyanide complex ion in an ammonium hydroxide solution are introduced in the wash solution, treating the wash solution successively with hydrogen cyanide and ammonia to produce cyanide complex ions of the metal impurities and to precipitate the uranium as ammonium diuranate away from the metal impurities in the solution, and then separating the ammonium diuranate precipitate from the solution.

3. The process of reclaiming uranium from the parts of a calutron composed of metals soluble in the wash solution and upon which uranium is deposited comprising washing the parts mentioned with a solvent for the uranium, whereby metal impurities of a class which forms soluble cyanide complex ion in an ammonium hydroxide solution are introduced in the wash solution, oxidizing the wash solution, treating the oxidized wash solution successively with hydrogen cyanide and ammonia to produce cyanide complex ions of the metal impurities and to precipitate the uranium as ammonium diuranate away from the metal impurities in the solution, and then separating the ammonium diuranate precipitate from the solution.

4. The process of recovering the residue of a water soluble uranium compound from the parts of a calutron disposed in the source region thereof, said parts being composed of metals soluble in the wash solution and upon which uranium is deposited, comprising washing the parts mentioned with water in order to dissolve the uranium compound, whereby metal impurities are introduced in the wash water, oxidizing the wash water, treating the oxidized wash water successively with hydrogen cyanide and ammonia to produce cyanide complex ions of the metal impurities and to precipitate the uranium as ammonium diuranate away from the metal impurities in the solution, and then separating the ammonium diuranate precipitate from the solution.

5. The process of recovering the residue of uranium tetrachloride from the parts of a calutron disposed in the source region thereof, said parts being composed of metals soluble in the wash solution and upon which uranium is deposited, comprising washing the parts mentioned with water in order to dissolve the uranium tetrachloride, whereby metal impurities are introduced in the wash water, oxidizing the wash water, treating the oxidized wash water successively with hydrogen cyanide and ammonia to produce cyanide complex ions of the metal impurities and to precipitate the uranium as ammonium diuranate away from the metal impurities in the solution, and then separating the ammonium diuranate precipitate from the solution.

6. The process of recovering metallic uranium from the collector of a calutron composed of metals soluble in the wash solution and upon which uranium is deposited comprising washing the collector with nitric acid in order to dissolve the uranium, whereby metal impurities are introduced in the wash solution, treating the oxidized wash solution successively with hydrogen cyanide and ammonia to produce cyanide complex ions of the metal impurities and to precipitate the uranium as ammonium diuranate away from the metal impurities in the solution, and then separating the ammonium diuranate precipitate from the solution.

7. The process of recovering metallic uranium from the collector of a calutron composed of metals soluble in the wash solution and upon which uranium is deposited comprising washing the collector with an acid containing an oxidizing agent in order to dissolve the uranium, whereby metal impurities are introduced in the wash solution, treating the oxidized wash solution successively with hydrogen cyanide and ammonia to produce cyanide complex ions of the metal impurities and to precipitate the uranium as ammonium diuranate away from the metal impurities in the solution, and then separating the ammonium diuranate precipitate from the solution.

8. The process of reclaiming uranium from the parts of a calutron composed of metals soluble in the wash solution and upon which uranium is deposited comprising washing the parts mentioned with a solvent for the uranium whereby metal impurities are introduced into the wash solution, treating the wash solution with hydrogen cyanide, then treating the wash solution with an alkali metal hydroxide to precipitate the uranium as an alkali metal diuranate away from the metal impurities in the solution, and then separating the alkali metal diuranate precipitate from the solution.

9. The process of reclaiming uranium from the parts of a calutron composed of metals soluble in the wash solution and upon which uranium is deposited comprising washing the parts mentioned with a solvent for the uranium whereby metal impurities are introduced into the wash solution, treating the wash solution with hydrogen cyanide, then treating the wash solution with an alkali metal hydroxide to precipitate the uranium as an alkali metal diuranate away from the metal impurities in the solution, then separating the alkali metal diuranate precipitate from the solution, dissolving the alkali metal diuranate with an acid, reducing the uranium present in the resulting solution to a lower valence state, treating the reduced solution with a soluble hydroxide to precipitate uranium as uranous hydroxide, and separating the uranous hydroxide precipitate from the solution.

10. The process of reclaiming uranium from the parts of a calutron composed of metals soluble in the wash solution and upon which uranium is deposited comprising washing the parts mentioned with a solvent for the uranium whereby metal impurities are introduced into the wash solution, treating the wash solution with an alkali metal cyanide, then treating the wash solution with a soluble hydroxide to precipitate the uranium as a diuranate away from the metal impurities in the solution, and then separating the diuranate precipitate from the solution.

11. The process defined in claim 10 wherein a mineral acid is added to the wash solution after the initial addition of alkali metal cyanide thereto, and in an amount sufficient to prevent premature precipitation of hydroxides of the metal impurities in the solution before such time as the metal impurities are converted into soluble cyanide complex ions by the alkali metal cyanide.

12. The process of reclaiming uranium from the parts of a calutron composed of metals soluble in the wash solution and upon which uranium is deposited comprising washing the parts mentioned with a solvent for the uranium whereby metal impurities are introduced into the wash solution, treating the wash solution with potassium cyanide, then treating the wash solution with an alkali metal hydroxide to precipitate the uranium as an alkali metal diuranate away from the metal impurities in the solution, and then separating the alkali metal diuranate precipitate from the solution.

13. The process of reclaiming uranium from the parts of a calutron composed of metals soluble in the wash solution and upon which uranium is deposited comprising washing the parts mentioned with a solvent for the uranium whereby metal impurities are introduced into the wash solution, treating the wash solution with an alkali metal cyanide, then treating the wash solution with a soluble hydroxide to precipitate the uranium as a diuranate away from the metal impurities in the solution, then separating the diuranate precipitate from the solution, treating the diuranate with an acid, reducing the uranium present in the solution to its lower valence state, treating the solution with a soluble hydroxide to precipitate uranium as uranous hydroxide, and separating the uranous hydroxide precipitate from the solution.

14. In a process for reclaiming uranium from the parts of a calutron composed of metals soluble in the wash solution and upon which uranium is deposited comprising washing the parts mentioned with a solvent for the uranium, whereby metal impurities are introduced in the wash solution, and separating uranium from the metal impurities contained in the wash solution; the steps of treating the wash solution in which the uranium is present in the +6 oxidation state with a compound selected from the group consisting of hydrogen cyanide and alkali metal cyanides and thereafter with a compound selected from the group consisting of ammonium hydroxide and alkali metal hydroxides, thereby producing soluble cyanide complex ions of the metal impurities and precipitating uranium as an insoluble diuranate away from the metal impurities in the solution, and then separating the insolube diuranate from the solution.

No references cited.